Figure 1:
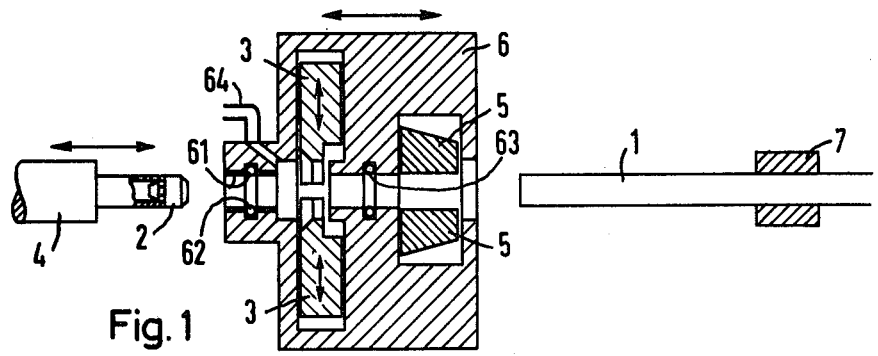

United States Patent [19]

Bezold

[11] 4,097,712
[45] Jun. 27, 1978

[54] METHOD OF JOINING NUCLEAR FUEL ROD END CAPS AND NUCLEAR FUEL ROD CLADDING TUBES

[75] Inventor: Helmut Bezold, Erlangen, Germany

[73] Assignee: Kraftwerk Union Aktiengesellschaft, Mulheim (Ruhr), Germany

[21] Appl. No.: 739,640

[22] Filed: Nov. 8, 1976

[30] Foreign Application Priority Data

Nov. 7, 1975 Germany .............................. 2550079

[51] Int. Cl.² .............................................. B23K 11/02
[52] U.S. Cl. ..................................... 219/107; 219/72; 219/161
[58] Field of Search ............. 219/107, 72, 158, 161 X; 228/219

[56] References Cited

U.S. PATENT DOCUMENTS

| 2,933,594 | 4/1960 | Johnson et al. | 219/72 |
| 3,188,446 | 6/1965 | Ray et al. | 219/72 |

*Primary Examiner*—Elliot A. Goldberg
*Attorney, Agent, or Firm*—Herbert L. Lerner

[57] ABSTRACT

Method of joining fuel rod end caps and cladding tubes by resistance pressure welding within a welding chamber. A welding device is brought into engagement with an end portion of a rigidly mounted cladding tube. An opening chuck as well as a divided welding electrode, both of which are mounted at one side of the welding chamber, are shifted along a predetermined length of the cladding tube end portion. The chuck and the divided welding electrode are brought into contact with the cladding tube end portion. Another welding electrode carrying and end cap is thrust into the welding chamber from the other side thereof so that the end cap is fed to the open end of the cladding tube end portion. The welding chamber is sealed by sealing members sealingly engaging the cladding tube end portion and the other welding electrode and then the interior of the welding chamber is evacuated and filled with protective gas. The end cap is pressed onto the open end of the cladding tube end portion. A welding current is passed through the welding electrodes so as to weld the end cap to the end of the cladding tube end portion.

3 Claims, 6 Drawing Figures

METHOD OF JOINING NUCLEAR FUEL ROD END CAPS AND NUCLEAR FUEL ROD CLADDING TUBES

The invention relates to a method of joining fuel rod end caps and fuel rod cladding tubes by means of resistance pressure welding practice within a welding chamber as well as optionally simultaneously evacuating the fuel rod and filling it with gas. The joining of fuel rod end caps and fuel rod cladding tubes is conventionally accomplished by means of the so-called TIG (tungsten-inert gas) method. In view of the relatively long welding time required therefor, extremely strict requirements as to the purity of the protective gas are necessary, especially in the case of zirconium alloys, in order to prevent the occurrence of oxidation phenomena.

For such joinings or connections, resistance pressure welding techniques had already been proposed, but only for relatively short cladding tubes having a length of about 50 cm. The short cladding tubes were inserted into the welding apparatus and were fed forward during the welding process by magnetic forces produced by the welding current. The practice of this heretofore known method is subjected to great difficulties for relatively long, fuel filled cladding tubes, since exact guidance of the tubes is necessary, requiring a very great technical outlay in order to ensure consistent results from repeated practice of the method.

However, since this heretofore known method affords very short welding periods, it is advantageous to modify it in such a manner that fuel rod cladding tubes of any desired length can also be closed off with end caps by using resistance pressure welding while requiring only a relatively limited technical outlay. In this connection, it should be possible to provide the fuel rods simultaneously with a high internal pressure, the so-called initial internal pressure.

It is accordingly an object of the invention to provide a method of joining fuel rod and caps and fuel rod cladding tubes which avoids the foregoing shortcomings of the heretofore known method of this general type.

With the foregoing and other objects in view, there is provided, in accordance with the invention, a method of joining fuel rod end caps and fuel rod cladding tubes by resistance pressure welding within a welding chamber, which comprises the steps of bringing a welding device into engagement with an end portion of a rigidly mounted cladding tube, shifting an open chuck as well as a divided welding electrode, both of which are mounted at one side of the welding chamber, along a predetermined length of the cladding tube end portion and bringing the chuck and the divided welding electrode into contact with the cladding tube end portion, thrusting into the welding chamber from the other side thereof another welding electrode carrying an end cap so that the end cap is fed to the open end of the cladding tube end portion and, after the welding chamber is sealed by sealing members sealingly engaging the cladding tube end portion and the other welding electrode, evacuating the interior of the welding chamber and filling it with protective gas, pressing the end cap onto the open end of the cladding tube end portion, and passing a welding current through the welding electrodes so as to weld the end cap to the end of the cladding tube end portion.

In accordance with another mode of the invention, all of the foregoing steps are performed in one operation at both open ends of a cladding tube previously filled with a charge of nuclear fuel so as to seal the nuclear fuel charge in the cladding tube thus closed at both ends thereof by the end caps welded thereto. This simultaneous closing of the cladding tube at both ends thereof facilitates the evacuation thereof as well as the subsequent filling thereof with gas. The fuel rod, which is thus closed off on both sides practically in one cycle, can then be brought to the next processing station e.g. for machining off the weldding bead, without requiring any involved reversing movements.

In accordance with a further feature of the invention there is provided a method which includes evacuating the fuel rod and filling it with gas while simultaneously joining the end cap to the cladding tube.

Other features which are considered as characteristic for the invention are set forth in the appended claims.

Although the invention is illustrated and described herein as embodied in method of joining fuel rod end caps and fuel rod cladding tubes, it is nevertheless not intended to be limited to the details shown, since various modifications may be made therein without departing from the spirit of the invention and within the scope and range of equivalents of the claims.

Figure 6:
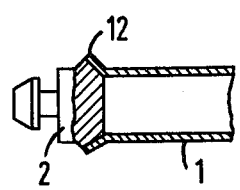

The invention, however, together with additional objects and advantages thereof will be best understood from the following description when read in connection with the accompanying drawings, in which:

FIGS. 1 through 5 are diagrammatic cross-sectional views of apparatus for carrying out the method of the invention in sequential phases thereof; and FIG. 6 is an enlarged fragmentary cross-sectional view of a fuel rod cladding tube joined with an end cap in accordance with the method of the invention.

Referring now to the figures of the drawing, there is shown therein one cladding tube 1 of a number thereof that are usually provided beforehand with nuclear fuel charges, and initially disposed in a non-illustrated magazine. From there, the cladding tubes 1 are brought sequentially to the closing or capping station by means of conventional devices such as conveyer chains and the like, for example. In this station, they are mounted as shown in FIG. 1 and are held against axial displacement by means of a suitable clamping device 7.

To the left-hand side of the thus mounted cladding tube 1, as seen in the figures, pressing welding devices are provided, only one of which is shown in the figures. The welding devices are mounted so as to be shiftable in axial direction of the cladding tubes 1, as indicated by the double-headed arrow at the top of FIG. 1.

Figure 2:
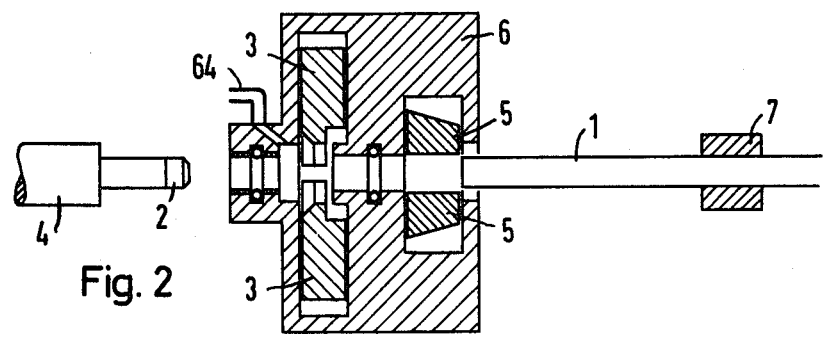

The welding machines travel toward the cladding tubes 1 until they engage the end of the cladding tubes, and they are locked in that position, as shown in FIG. 2. The stop at which engagement occurs may be purely of a mechanical type but could also be effected by a photoelectric device or other conventional devices.

Figure 3:
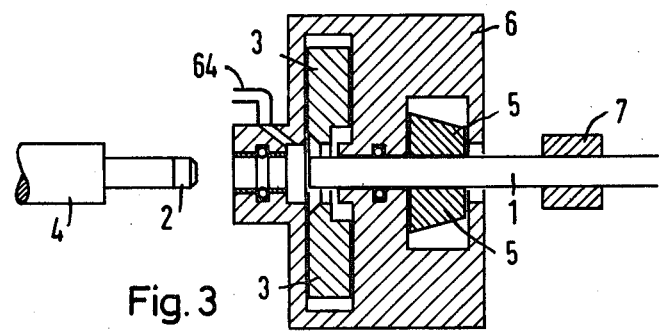
Figure 4:
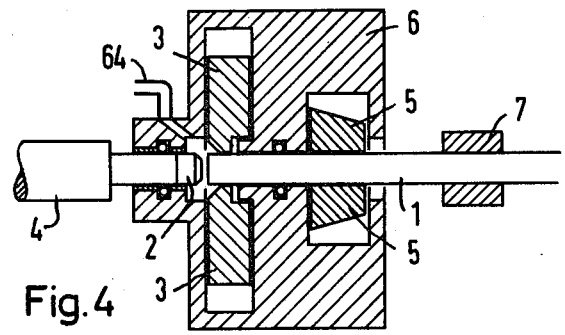
Figure 5:
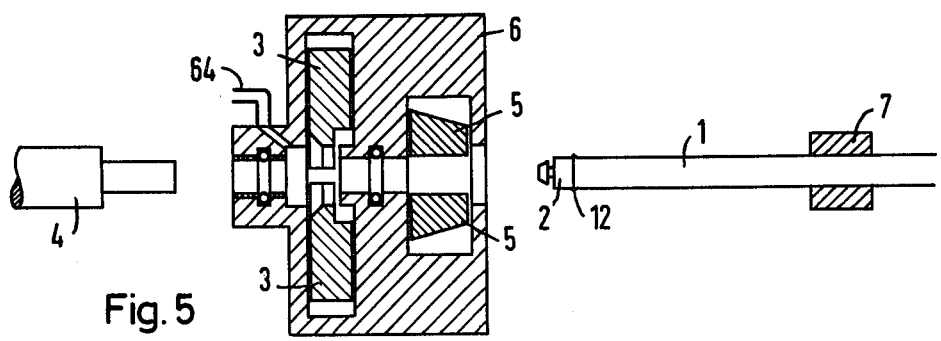

The welding chamber 6 then travels over a given length of the cladding tube 1, as shown in FIG. 3. Then, a chuck or collet 5, which is brought into contact with the cladding tube 1 by any suitable conventional means produces a force-locking connection between the cladding tube 1 and the welding chamber 6. In addition, the forward end of the cladding tube 1 is engaged on all sides thereof by a bipartite welding electrode 3, as illustrated in FIG. 4. A second welding electrode 4 has, in the interim, been furnished with an end cap 2 in the indicated manner. The electrode 4 is provided for this purpose with a conventional resilient endcap take-up device, which is not shown in detail in the figures. After the welding electrode 3 has made contact with the cladding tube 1, the second welding electrode 4 is then inserted, through a bore formed in the wall of the welding chamber 6 and lined with insulating material 61, into the interior of the welding chamber 6 to a position just short of the end of the cladding tube 1, as shown in FIG. 4. The welding chamber 6 is thereupon closed off gastightly due to the pressing of sealing rings 63 and 62 (FIG. 1) against the cladding tube 1 and the welding electrode 4, respectively. The interior of the welding chamber 6 as well as the interior of the cladding tube 1 are then evacuated by means of a connecting pipe 64 and are filled thereafter with an inert gas, such as helium, for example, up to a predetermined pressure (initial internal pressure).

After this condition is attained, the electrode 4 travels on until it makes pressure-contact with the end of the cladding tube 1 i.g. for a distance that is normally at most only 1 mm. After a predetermined contact pressure has been attained, the welding current is either manually or automatically switched on. The transformer required therefore, the welding timer, as well as the lead to the welding electrodes 3 and 4 are not illustrated in the interest of clarity, and because the illustration thereof is believed to be unnecessary since they are well known in the art.

After the welding process has been completed, the welding time being, for example, only 0.02 sec, the chuck or collet 5, the electrodes 3 and 4 as well as the seals 62 and 63 return to the starting position thereof. The opening of the welding electrode 3 and the chuck or collet 5 is large enough so that, during the subsequent return travel of the welding chamber 6, no contact can occur between the welding bead 12 formed at the cladding tube 1 and either the electrode 3 or the chuck 5. This condition is shown diagrammatically in FIG. 5.

FIG. 6 shows the sealed cladding tube end in a cross sectional view. As is apparent in FIG. 6, the cladding tube has been bent outwardly slightly at the end thereof by the welding process. This was caused by the bevelled shape of the welding electrode 3 which is used for improving the welding contact. After the closed cladding tube 1 is taken out of the clamping device 7, the welding bead 12 is removed by a chip-removing operation in an adjacent non-illustrated work station.

During this operation wherein the welding bead is removed, a new cladding tube able to be inserted into the welding apparatus and locked-in in the hereinaforedescribed manner.

The movements of the welding apparatus as a whole as well as of the welding chamber 6 and the electrode 4 can be effected magnetically, electromotively or pneumatically, in a conventional manner. It should not be left unmentioned that it is possible, of course, to further provide control devices for seating the end cap 2 in the electrode 3 and in the cladding tube 1 before the start of the welding process per se, and to incorporate them functionally into the cycle of the individual steps of the process.

Extensive tests have shown that it is possible with the method of the invention in the instant application to produce absolutely flawless welded joints between end caps and cladding tubes of nuclear reactor fuel rods in an especially efficient and economical manner.

There are claimed:

1. Method of joining fuel rod end caps and fuel rod cladding tubes by resistance pressure welding within a welding chamber, which comprises the steps of bringing a welding device into engagement with an end portion of a rigidly mounted cladding tube, shifting an opened chuck as well as a divided welding electrode, both of which are mounted at one side of the welding chamber, along a predetermined length of the cladding tube end portion and bringing the chuck and the divided welding electrode into contact with the cladding tube end portion, thrusting into the welding chamber from the other side thereof another welding electrode carrying an end cap so that the end cap is fed to the open end of the cladding tube end portion and, after the welding chamber is sealed by sealing members sealingly engaging the cladding tube end portion and the other welding electrode, evacuating the interior of the welding chamber and filling it with protective gas, pressing the end cap onto the open end of the cladding tube end portion, and passing a welding current through the welding electrodes so as to weld the end cap to the end of the cladding tube end portion.

2. Method according to claim 1 which comprises performing all of the foregoing steps in one operation at both open ends of a cladding tube previously filled with a charge of nuclear fuel, so as to seal the nuclear fuel charge in the cladding tube thus closed at both ends thereof by the end caps welded thereto.

3. Method according to claim 1 which includes evacuating the fuel rod and filling it with gas while simultaneously joining the end cap to the cladding tube.

* * * * *